US010151580B2

(12) United States Patent
Wong et al.

(10) Patent No.: US 10,151,580 B2
(45) Date of Patent: Dec. 11, 2018

(54) METHODS OF INSPECTING A 3D OBJECT USING 2D IMAGE PROCESSING

(71) Applicant: Generic Power Ptd Ltd, Singapore (SG)

(72) Inventors: Kok Weng Wong, Singapore (SG); Albert Archwamety, Singapore (SG); Han Cheng Ge, Singapore (SG); Ruini Cao, Singapore (SG)

(73) Assignee: GENERIC POWER PTD LTD, Singapore (SG)

( * ) Notice: Subject to any disclaimer, the term of this patent is extended or adjusted under 35 U.S.C. 154(b) by 96 days.

(21) Appl. No.: 15/115,295

(22) PCT Filed: Apr. 29, 2015

(86) PCT No.: PCT/SG2015/050087
§ 371 (c)(1),
(2) Date: Jul. 29, 2016

(87) PCT Pub. No.: WO2015/183196
PCT Pub. Date: Dec. 3, 2015

(65) Prior Publication Data
US 2017/0254639 A1    Sep. 7, 2017

(30) Foreign Application Priority Data
May 27, 2014  (SG) .......................... 10201402681Q (51) Int. Cl.
*H04N 9/47*  (2006.01)
*G01B 11/06*  (2006.01)
(Continued)

(52) U.S. Cl.
CPC .......... *G01B 11/0608* (2013.01); *G06T 7/521* (2017.01); *H04N 7/183* (2013.01); *G01B 11/25* (2013.01)

(58) Field of Classification Search
CPC ...................................................... H04N 7/183
See application file for complete search history.

(56) References Cited

U.S. PATENT DOCUMENTS

| 2003/0198374 A1* | 10/2003 | Hagene ................ G01N 21/954 382/141 |
| 2006/0017937 A1 | 1/2006 | Vaccaro |

(Continued)

FOREIGN PATENT DOCUMENTS

| EP | 0192993 | 9/1986 |
| JP | 2010054399 A | 3/2010 |

OTHER PUBLICATIONS

International Preliminary Report on Patentability for corresponding application PCT/SG2015/050087 filed Apr. 29, 2015; dated Dec. 10, 2015.

(Continued)

*Primary Examiner* — Tat C Chio
*Assistant Examiner* — Fabio S Lima
(74) *Attorney, Agent, or Firm* — Cantor Colburn LLP (57) ABSTRACT

The present disclosure provides a system and method to convert three-dimensional data into a two-dimensional height displacement map and extract the three-dimensional features and dimensions of a three-dimensional object using a two-dimensional image processing technique. An illumination source of the system scans across the workspace using a line laser and generates a two-dimensional height displacement map of the workspace. The individual pixel location represents an actual workspace sampled location. The pixel gray scale intensity represents the Z displacement height at the pixel location. A processing device processes the features and dimensions within two-dimensional image as a gray scale using two-dimensional image processing such as pattern match, blob, convolution and edge detection.

7 Claims, 5 Drawing Sheets

(51) Int. Cl.
      *G06T 7/521*       (2017.01)
      *H04N 7/18*       (2006.01)
      *G01B 11/25*       (2006.01)

(56) References Cited

U.S. PATENT DOCUMENTS

| | | | | |
|---|---|---|---|---|
| 2013/0229510 A1* | 9/2013 | Killmann | ............ | B07C 5/3416 |
| | | | | 348/91 |
| 2014/0347473 A1* | 11/2014 | Wolff | ............ | G01B 11/026 |
| | | | | 348/135 |
| 2015/0055339 A1* | 2/2015 | Carr, Jr. | ............ | F21V 33/0044 |
| | | | | 362/234 |

OTHER PUBLICATIONS

International Search Report for corresponding application PCT/SG2015/050087 filed Apr. 29, 2015; dated Jun. 10, 2015.
Written Opinion for corresponding application PCT/SG2015/050087 filed Apr. 29, 2015; dated Jun. 10, 2015.

* cited by examiner

METHODS OF INSPECTING A 3D OBJECT USING 2D IMAGE PROCESSING

TECHNICAL FIELD

The present invention relates to measuring of three-dimensional features and/or dimensions of manufactured parts. More specifically, the present invention relates to measurement of three-dimensional features and/or dimensions using two-dimensional image processing method(s) on a two-dimensional height displacement map.

BACKGROUND OF INVENTION

A variety of inspection methods have been designed to inspect three-dimensional features of manufactured objects using a spot and/or a line laser. For relatively simpler three-dimensional object features, these methods measure height differences of the three-dimensional objects. To measure complex three-dimensional object features, these methods require complex algorithms and long measuring times to process the data and determine whether the object meets the manufacturer's specifications.

In systems employing a spot laser, a laser beam is moved to a different location of a target to perform measurement. A sensor provided in such systems measures only one point at a time. Measurement may be of for example, the location of the maximum intensity of reflected light on the sensor that may in turn indicate the height of a specific point on the three-dimensional object. Therefore, the number of points measured is limited and the movement of the spot laser between two points is slow. The disadvantage of these systems is that the target location must be known precisely before inspection. Further, the three-dimensional feature and/or dimension information retrieved may be very limited and error-prone due to positional errors.

In systems employing a line laser, a laser line is projected across a target. The laser line is moved across the target to scan the target and information is collected to perform measurement of three-dimensional surface of the target. Specifically, a line profile cross section of the target may be measured at each position. Within the line profile, relative regions within the line can be measured with high accuracy. The disadvantage of these systems is that the position of the target in the moving direction must be known precisely before inspection. Further, computing three-dimensional features and/or dimensions on the line profile while scanning the target needs long computation times as such systems require complex three-dimensional algorithms to process the data. Even though the number of points measured may be improved but the measuring speed is slow.

Thus, there is a need for a system/method to inspect the three-dimensional features and/or dimensions of a three-dimensional object in a simple and efficient manner.

SUMMARY

The following summary is provided to facilitate an understanding of some of the innovative features unique to the disclosed embodiment and is not intended to be a full description. A full appreciation of the various aspects of the embodiments disclosed herein can be gained by taking into consideration the entire specification, claims, drawings, and abstract as a whole.

It is, therefore, one aim of the disclosed embodiments to provide a method of measuring a height of a location on an object including projecting at least one line of radiation onto the object, detecting at least one line of radiation reflected from the object including semi-transparent surface, generating at least one two-dimensional height displacement map from the detected line of radiation, wherein the two-dimensional height displacement map comprises a plurality of spots; and processing the intensity of each spot of the plurality of spots as a gray-scale using a two-dimensional image processing technique to measure the features or dimension of the object at that point.

It is another aim of the disclosed embodiments to provide an apparatus for measuring a height of a location on an object, comprising at least one illumination source configured to output at least one line of radiation onto the object; at least one image capturing unit configured to detect at least one line of radiation reflected from the object; and at least one processing unit configured to generate a two-dimensional height displacement map from the detected line of radiation, wherein the two-dimensional height displacement map comprises a plurality of spots; wherein all the processing unit processes the intensity of each spot of the plurality of spots as a gray-scale using a two-dimensional image processing technique to calculate the height of the object at that point.

It is another aim of the disclosed embodiments that the illumination source is a line source.

It is another aim of the disclosed embodiments that to provide an object that is a three-dimensional object.

It is one aim of the disclosed embodiments that the two-dimensional image processing technique further comprises at least one of an edge detection technique, a convolution technique, a blob analysis technique and a pattern matching technique.

Other aspects and advantages of the invention will become apparent from the following detail description, taken in conjunction with the accompanying drawings, illustrating by way of example the principles of the invention.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

DETAILED DESCRIPTION OF ILLUSTRATIVE EMBODIMENTS

The particular values and configurations discussed in these non-limiting examples can be varied and are cited merely to illustrate at least one embodiment and are not intended to limit the scope thereof.

Figure 1:
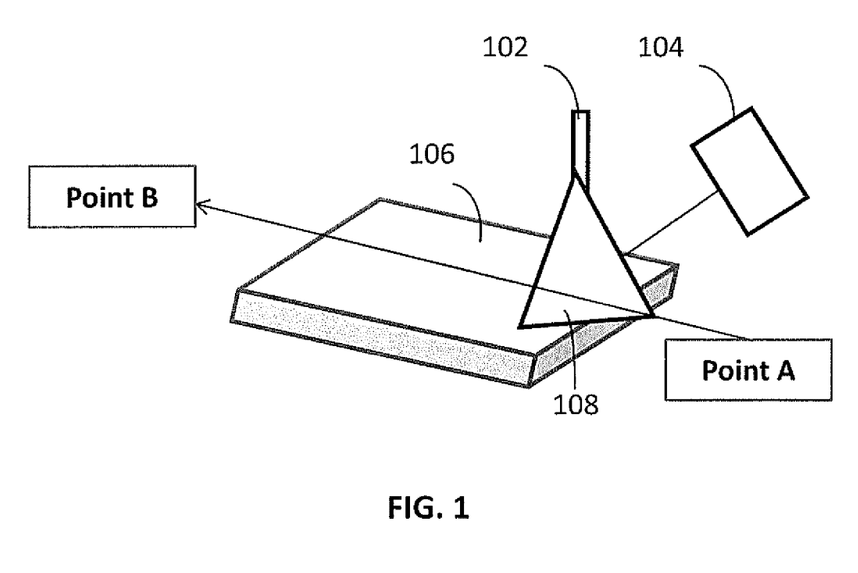
FIG. 1 illustrates an illumination source and image capturing unit assembly for measuring one or more points across a line in accordance with an embodiment of the present invention.

FIG. 1 illustrates an illumination and image capturing unit assembly for measuring one or more points across a line in accordance with an embodiment of the present invention. The assembly includes an illumination source 102 and an image capturing unit 104 projected over a workspace 106. The illumination source 102, such as a line laser or a laser light element that produces a beam of light having a predetermined beam width is used. That beam of light is provided to a projector (internal to the illumination source 102, not shown), which converts the beam of light into a scan line. The scan line maybe a single line or a plurality of parallel lines, which are then output from the illumination source 102. Exemplary laser light sources include LED line projector, DLP Projector, LED Multi-line projector, multi-line laser, structured light projector.

By way of example, FIG. 1 shows a system according to the invention, with a line laser illumination source 102 that projects a beam of light 108 on the workspace 106 on which a three-dimensional object is placed. Further, the system scans across the workspace 106 from a known reference position point A to a known reference end position point B. The three-dimensional object is any object whose features and/or dimensions are to be measured and is placed in the line of measurement, for example, along the line between point A and point B as shown in the figure. Feature may include a desired feature such as a contact or undesired feature such as foreign material, damage on the contact that extent into the surface of the contact. Contacts may include objects for detection such as BGA balls, QFP leads, LGA Pads or QFN pads. Defects such as void i.e. empty bubble, war-page and indentation can damage the contacts. Dimensions refer to length, height and area of features and length, height and angle differences between features.

In various embodiments, the line of measurement is selected based upon the location of the object whose dimensions and/or features are to be measured. The beam of light 108 for example, a planar light beam, is projected on the object which is reflected back on hitting the object, whose height is to be determined. The beam of light 108 may include a plurality of laser lines onto an area of the workspace 106 at which the object, such as box, is to be measured. The image capturing unit 104 such as a camera, captures the reflected light in the form of an image. The image capturing unit 104 may be configured to capture images at predefined intervals. The surface area from which light is received by the image capturing unit 104 is shown as a particular region of the top surface of the workspace 106, but it may alternatively correspond to any flat surface on which an object is to be measured. A processing unit (described with reference to FIG. 2) processes data received from the image capturing unit 104.

The beam of light 108 projected on the flat surface of the workspace 106 are in form of straight lines. These straight lines are reflected back when they hit the flat surface at a particular angle. If the rays of the beam of light 108 strikes an object having height, they are reflected back without having to travel the flat surface of the workspace 106. Due to this, the light intensity displacement of such reflected rays is greater than the light intensity displacement of the rays reflected by the surface of the workspace 106. The light intensity is thus used as a factor to calculate the height of a point on the object from which the light is reflected.

The determination of height of the object is dependent on laser to camera angle. As the laser to camera angle approaches 90 degree, the resolution increases. When the beam of light 108 strikes an object having a height, the rays are reflected towards the camera. Camera comprises of a sensor which senses the intensity of the reflected light. The sensor includes CCD or CMOS sensor which is part of camera. If the object is higher, the beam of light will reach the object and reflected into the upper portion of the sensor. The sensor indicates a higher intensity at the location corresponding to the reflection surface. The other location on the sensor with no reflected light appears dim. The highest intensity and the top most significant intensity appearing in the sensor will indicate the surface height. By calculating the amount of light falling on a neighboring pixel, sub-pixel height accuracy can be achieved. For example, when no object is placed, the intensity of light of a reflected beam would be zero, accordingly, the height will be considered to be zero.

The device of instant invention may measure the height of the object when placed on a media transfer, such as, tray, tape or cassette. If there is a background media transfer, the height will be the media transfer height. When an object having height is in the path of the rays of light, light is reflected off the object surface and captured by the sensor. Intensity displacement analyzed by sensor depends on the height of the object surface. Ray reflection location is then evaluated to measure height of object.

Figure 2:
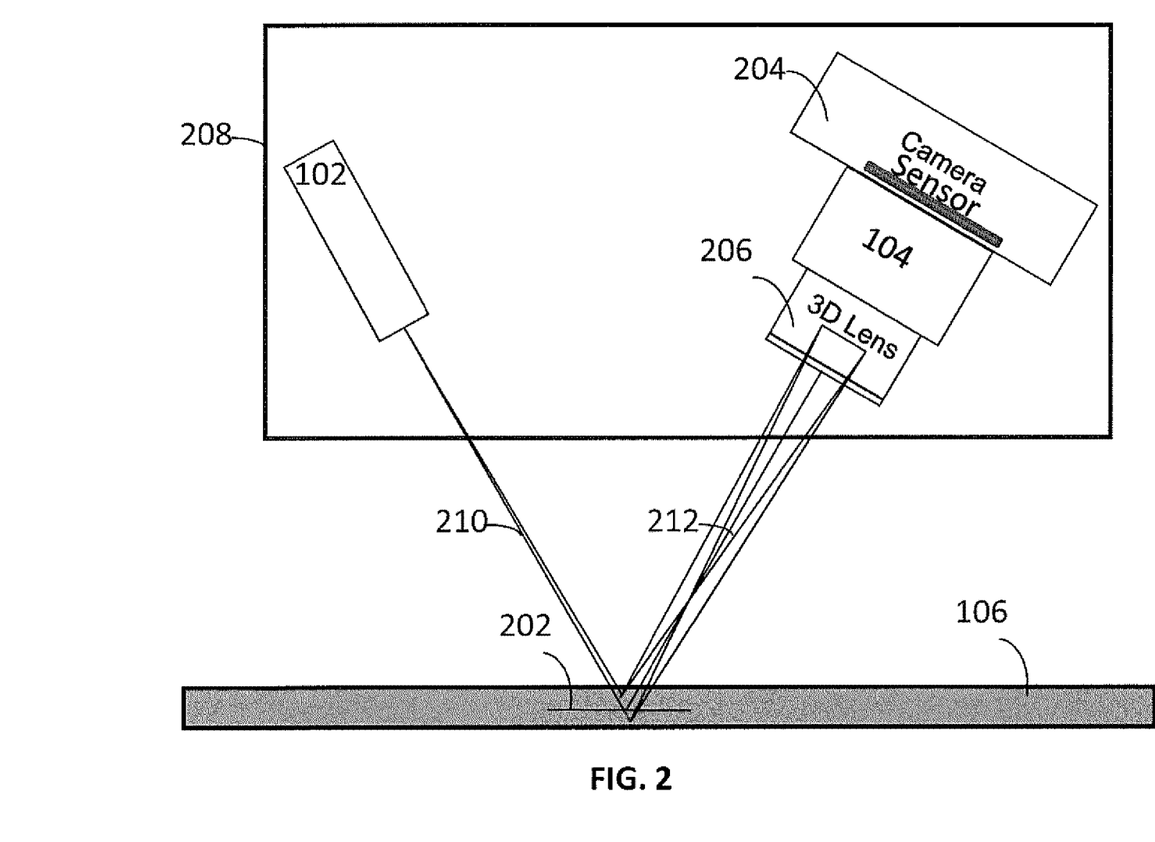
FIG. 2 illustrates the illumination source and image capturing unit and sensor assembly projected on an object in accordance with an embodiment of the present invention.

FIG. 2 illustrates the illumination source 102 and image capturing unit 104 assembly projected on an object 202 in accordance with an embodiment of the present invention. In an embodiment, the image capturing unit 104 includes a camera with sensor 204 and one or more lenses 206. The sensor 204 indicates bright and dull spot depending upon the intensity of light perceived. The camera can be single camera, or a plurality of cameras placed together. With multiple cameras, the beam of ray of light captured by different cameras can be used to calculate the height with better accuracy and remove occlusion caused by single camera. The camera and lens can be placed parallel when a small region is needed to be in focus. Alternately, the lens can be tilted based on Scheimpflug principle to bring the laser plane into focus and increase the Depth of Field (DOF) further. The illumination source 102 and image capturing unit 104 can be hosted in a single scanner head 208 as shown in FIG. 2. The scanner head 208 is coupled to a processing device that processes the data captured by the image capturing unit 104. The scanner head 208 is mounted on a movable assembly that moves the scanner head at for example, a constant speed. Further, the scanner head 208 is located above the field of measurement of the workspace 106, as shown in FIG. 2. The camera can be placed at the sides or bottom with respected to the object. Though the illumination source 102 and image capturing unit 104 are shown as part of a single scanner head, it is possible to provide them as separate units also.

Figure 3:
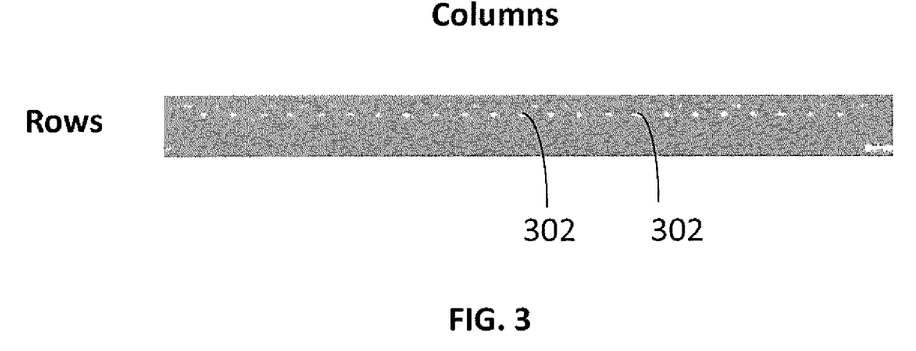
FIG. 3 depicts an exemplary illustration of the intensity of a reflected laser line sensed by the sensor at one column in accordance with an embodiment of the present invention.
Figure 4A:
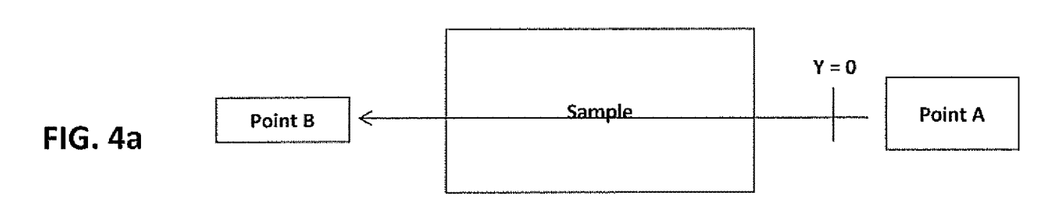
FIG. 4a depicts an image captured at a first trigger location with Y co-ordinate equal to zero.
Figure 4B:
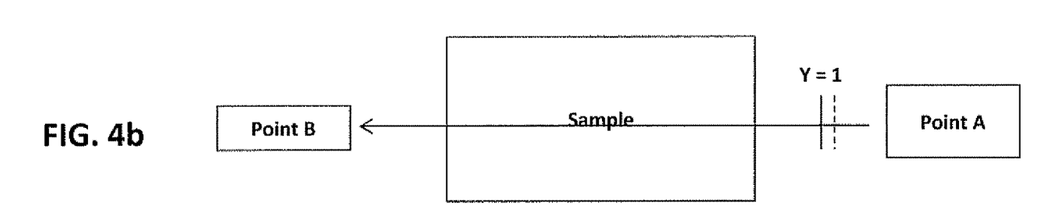
FIG. 4b depicts an image captured at a second trigger location with Y co-ordinate equal to one.
Figure 4C:
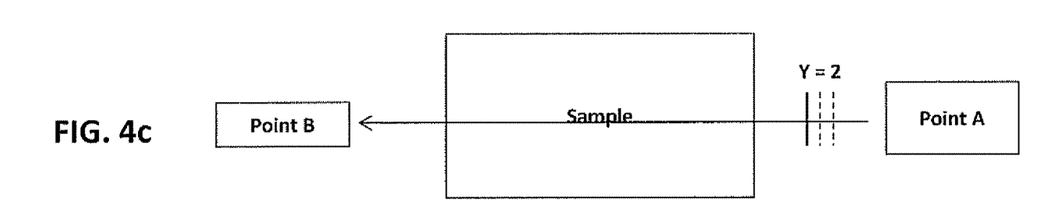
FIG. 4c depicts an image captured at a third trigger location with Y co-ordinate equal to two.
Figure 4D:
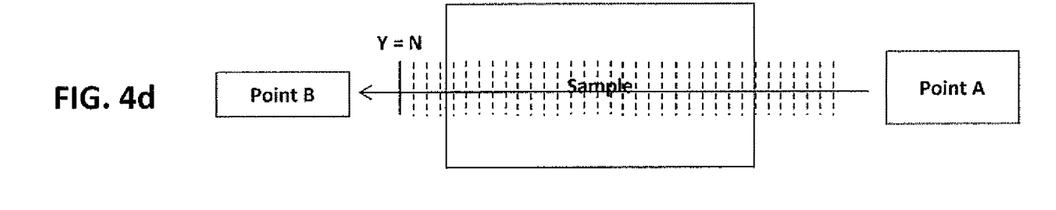
FIG. 4d depicts an image captured at a Nth trigger location with Y co-ordinate equal to N.
Figure 5:
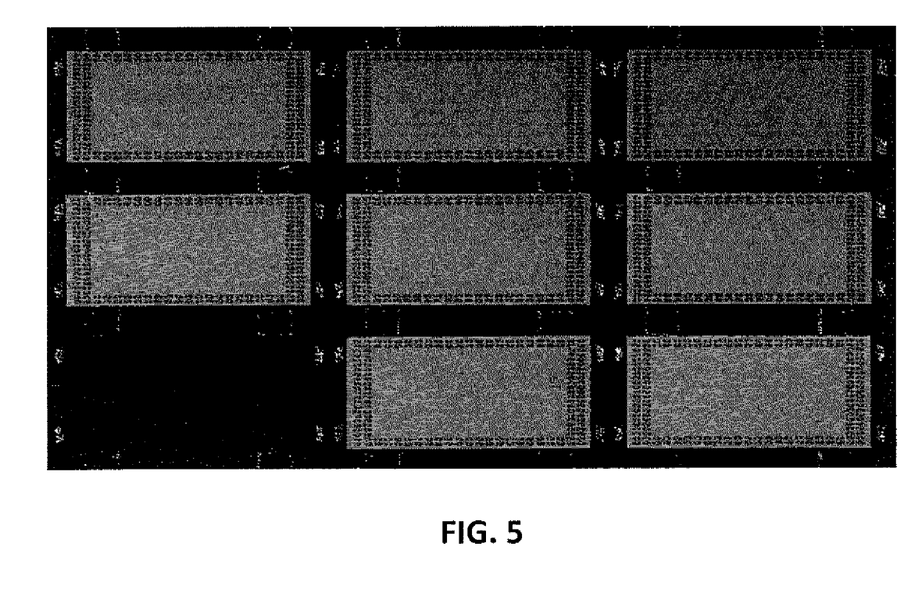
FIG. 5 depicts a two-dimensional height displacement mapping accordance with an embodiment of the present invention.

To measure the height of the object 202, the scanner head 208 projects a planar laser beam 210 generated by the line laser source 102 across the field of measurements. The planar laser beam 210 is reflected back after hitting the object 202 located on the workspace 106. The lens 206 provided with the scanner head 208 captures the reflected light 212 from the object 202. As the scanner head 208 moves across the workspace 106, an encoder (not shown) provided with the image capturing unit 104 triggers the camera to capture images at a predefined interval distance for example, 10 microns, starting from point A to point B. At each trigger, a single image is captured which is processed into a single row of a two-dimensional height displacement map. The reflected laser line is projected as a line profile on the image that includes a plurality of dots. An exemplary two-dimensional height displacement map is depicted in FIG. 3. In FIG. 3, the dots 302 depict light intensity of the various pixels corresponding to the points on which the planar light beam 210 falls on the object 202 for a fixed position of the Y-axis. In other words, the individual pixel location represents an actual workspace sampled location for a fixed position of the Y-axis. The light intensity displacement of the dots is used to determine the Z displacement height of the corresponding point on the object 202. For example, the pixel gray scale intensity represents the Z displacement height at the pixel location.

The processing unit, for example, a computer, processes every column in the image. The column (for example, as shown in FIG. 3) on the image represents the X position on the two-dimensional height displacement map. The processing unit checks whether a spot in a row is a bright laser reflection spot from the object 202 in the column. The bright laser reflection spot indicates the height. In an embodiment, the height displacement measurement accuracy can be further increased by measuring the spot with a sub-pixel accuracy. The height of the object is calculated by following formula:

Object height=Height on sensor/($x$ cosine(90 degree−(laser angle+camera angle)))/cosine(laser angle), wherein height of sensor signifies the height to the y-location of the pixel with maximum intensity on the sensor; wherein laser angle is angle between the laser beam and a line drawn from the object to be perpendicular to workstation, and wherein camera angle is angle between reflected ray and a line drawn from the object to be perpendicular to workstation.

As mentioned earlier, the scanner head 208 scans the workspace 106 from point A to point B in turn capturing a number of images. These images are used to generate a two-dimensional height displacement map of the object 202. Using this two-dimensional height displacement map, the features and/or dimensions of the object 202 can be located using two-dimensional image processing.

The two-dimensional image processing techniques that may be employed are edge detection to bring out the contour of the three-dimensional object matching these with a known model to locate the object position and orientation. Using edge detection to find the dimension and feature of the object. Another two-dimensional image processing technique includes pattern matching to match the gray-scale intensity pattern against a model with pattern to locate the object, matching the object for extra or missing features from the model. Yet another two-dimensional image processing technique includes blob analysis to match the blob features with the model to locate the target object. Measure the size, orientation, height of the blob features in 3D. Yet another technique is to use convolution to find corner, surface texture, curvature of the surface. These features can be combined to compute more complex measurements. Example: war-page, co-planarity, stand-off, bend and twist.

The two-dimensional map images can be calibrated by scanning an object of known height, for example: Scanning two flat planes of know thickness generates two gray-scale images representing two heights across the field of measurement. This image can be interpolated to calibrate a look up table for all gray-scale value to a measurements height. Thereafter, once the object 202 is located, the features can be measured precisely by converting the intensity at any point to a calibrated height value.

The present invention will now be described using an example depicted in FIGS. 4($a$-$d$) and 5.

FIG. 4$a$ depicts an image captured at a first trigger location with Y co-ordinate equal to zero, namely, the first image is processed for row Y=0. FIG. 4$b$ depicts an image captured at a second trigger location with Y co-ordinate equal to one, namely, the second image is processed for row Y=1. FIG. 4$c$ depicts an image captured at a third trigger location with Y co-ordinate equal to two, namely, the third image is processed for row Y=2. FIG. 4$d$ depicts an image captured at a $N^{th}$ trigger location with Y co-ordinate equal to N, namely, the N image is processed for row Y=N−1. Thus, the two-dimensional height displacement map contains as many rows as many triggers. For example, if there are 10,000 triggers, the two-dimensional height displacement map will contain 10,000 rows.

The images of FIGS. 4($a$-$d$) are captured in a sequence, for example, in the same sequence in which that are captured by the camera 104. The position of an image in the sequence indicates the image position with respect to point A. If the encoder is set to trigger at an interval of 10 microns, each row in the two-dimensional height displacement map represents an offset of Y×10 microns from point A. The images of FIGS. 4($a$-$d$) are depicted as a two-dimensional height displacement map of FIG. 5 in accordance with an embodiment of the present invention.

Through the above description, one can understand that this system of measuring three-dimensional features is fast and simple. The present invention does not use complex three-dimensional image processing algorithms rather two-dimensional algorithms that process the data quickly and efficiently. Further, the location of the target does not need to be known precisely before scanning. Scanning is thus simplified and can be done quickly.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Although embodiments of the current disclosure have been described comprehensively, in considerable detail to cover the possible aspects, those skilled in the art would recognize that other versions of the disclosure are also possible.

What is claimed is:

1. A method of measuring a height of a location on an object, comprising:
   projecting at least one line of radiation onto the object using at least one illumination source, wherein the object is placed on the surface of a workstation;
   detecting at least one line of radiation reflected from the object including semi-transparent surface using at least one image capturing unit comprising at least one sensor and at least one camera; and generating at least one two-dimensional height displacement map from the detected line of radiation, wherein the two-dimensional height displacement map comprises a plurality of spots using at least one processing unit; and processing the intensity of each spot of the plurality of spots as a gray-scale using a two-dimensional image processing technique to calculate the height of the object at each spot;

the height of the object is calculated by following formula:

Object height=Height of sensor/($x$ cosine(90 degree−(laser angle+camera angle)))/cosine(laser angle), wherein height of sensor signifies the height to the y-location of the pixel with maximum intensity on the sensor;

wherein x represents the x position on the two-dimensional height displacement map;

wherein laser angle is angle between the laser beam and a line drawn from the object, wherein the line drawn is perpendicular to the planar surface of the workstation;

wherein camera angle is angle between a reflected ray and a line drawn from the object, wherein the line drawn is perpendicular to the planar surface of the workstation; and wherein the reflected ray is at least one line of radiation reflected from the object.

2. The method of claim 1, wherein the object is a three-dimensional object.

3. The method of claim 1, wherein the two-dimensional image processing technique further comprises at least one of an edge detection technique, a convolution technique, a blob analysis technique and a pattern matching technique.

4. An apparatus for measuring a height of a location on an object, comprising:

at least one illumination source configured to output at least one line of radiation onto the object;

at least one image capturing unit comprising at least one sensor and at least one camera configured to detect at least one line of radiation reflected from the object; and at least one processing unit configured to generate a two-dimensional height displacement map from the detected line of radiation, wherein the two-dimensional height displacement map comprises a plurality of spots;

wherein all the processing unit processes the intensity of each spot of the plurality of spots as a gray-scale using a two-dimensional image processing technique to calculate the height of the object at each spot;

The height of the object is calculated by following formula:

Object height=Height on sensor/($x$ cosine(90 degree−(laser angle+camera angle)))/cosine(laser angle), wherein height of sensor signifies the height to the y-location of the pixel with maximum intensity on the sensor;

wherein x represents the x position on the two-dimensional height displacement map;

wherein laser angle is angle between the laser beam and a line drawn from the object, wherein the line drawn is perpendicular to the planar surface of the workstation;

wherein camera angle is angle between a reflected ray and a line drawn from the object, wherein the line drawn is perpendicular to the planar surface of the workstation; and wherein the reflected ray is at least one line of radiation reflected from the object.

5. The system of claim 4, wherein the object is a three-dimensional object.

6. The system of claim 4, wherein the illumination source is a line source.

7. The system of claim 4, wherein the two-dimensional image processing technique further comprises at least one of an edge detection technique, a blob analysis technique and a pattern matching technique.

* * * * *